United States Patent [19]

Barbour et al.

[11] 3,949,380

[45] Apr. 6, 1976

[54] PERIPHERAL DEVICE REASSIGNMENT CONTROL TECHNIQUE

[75] Inventors: Kenneth R. Barbour, Burlington; Henry J. Evans, Harvard, both of Mass.

[73] Assignee: Honeywell Information Systems, Inc., Waltham, Mass.

[22] Filed: Apr. 22, 1974

[21] Appl. No.: 463,018

[52] U.S. Cl. ............................................ 340/172.5
[51] Int. Cl.² ........................................... G06F 3/00
[58] Field of Search ................................. 340/172.5

[56] References Cited
UNITED STATES PATENTS

| | | | |
|---|---|---|---|
| 3,340,512 | 9/1967 | Hauck et al. | 340/172.5 |
| 3,581,286 | 5/1971 | Beausoleil | 340/172.5 |
| 3,593,302 | 7/1971 | Saito et al. | 340/172.5 |
| 3,639,909 | 2/1972 | Hauck et al. | 340/172.5 |
| 3,792,448 | 2/1974 | Bennett et al. | 340/172.5 |

*Primary Examiner*—Raulfe B. Zache
*Attorney, Agent, or Firm*—John S. Solakian; Ronald T. Reiling

[57] ABSTRACT

A plurality of peripheral devices having physical addresses are accessed by a host processor by use of logical addresses which are utilized by the various programs in a multiprocessing environment. Input/output tables are arranged to include pointers for relating the logical address provided by a programmer to the physical address of the device thereby providing necessary device specific information to the peripheral controller coupled with the peripheral devices. The input/output tables are structured so that pointers relating the physical and logical addresses may be changed to reassign the logically addressed device to another device and accordingly to point to another physical address.

12 Claims, 4 Drawing Figures

PERIPHERAL DEVICE REASSIGNMENT CONTROL TECHNIQUE

RELATED APPLICATIONS

The following application is incorporated by reference to the instant application.

Table Driven Emulation System, Inventor: Alan C. Hirtle, Ser. No. 430,322, filing date Jan. 2, 1974.

BACKGROUND OF THE INVENTION

The present invention relates to data processing systems and more specifically to peripheral device addressing techniques.

In a data processing system capable of providing service to a plurality of programs, and in which a plurality of peripheral devices are attached for data transfer with the processor, it is typically necessary in order to provide flexibility, to allow the programmer the use of logical names or addresses of peripheral devices to which it will communicate data without need to identify the physical peripheral device which it in fact will communicate with. Further for increased flexibility it is often necessary to allow the operator to reassign the correspondence between the logical address which he has picked and which he has related to a physical address or the actual peripheral number, to change it to address another physical peripheral. This may be required either because for example the peripheral device he is using becomes inoperative or because for example at some interim time, another programmer is utilizing the same physical peripheral device. The need for this flexibility is particularly evident and necessary in data processing systems which are among other things utilized to emulate another data processing system.

In the prior art, peripheral devices have been reassigned by means of hard wired switching techniques wherein, should the operator require that his program work with another physical peripheral device, he would actually, after mounting for example a tape in a tape peripheral device, change the switches in the host processor's console in order to provide a data path as required. In addition to requiring a fairly substantial amount of time to accomplish this, such reassignment control has not been as flexible as might be desired. Further, such, what may be termed mechanically switched control, has not been adequate in systems which are utilized to emulate another data processing system. Further the time required to mechanically switch such connection is not compatible with today's high speed systems.

Accordingly, it is an object of the invention to provide a flexible means included in a data processing system for affecting reassignment control of peripheral devices to logical addresses utilized in the computer programs operating in the data processing system.

SUMMARY OF THE INVENTION

A plurality of peripheral devices coupled with a host processor, each peripheral device having assigned thereto a device specific table, each device specific table basically including device specific information and further including status information for that particular device as well as other pointers including the logical address currently corresponding to the physical device number as well as an address to a device table which in turn directly interfaces with the data processing system in order to receive programmer information. The device table includes device logical addresses as utilized by the various programs and includes general status information of the device as well as a pointer to the device specific table. Although there is one device specific table per physical peripheral device, there is only one device table per group of potential physical peripheral devices; the device table including an entry for each such potential physical peripheral device. Entries for the device table, in addition to being received from the programming information, and entries to the device specific tables, are also received from a reassignment table which may receive for example up to eight entries to effect the reassignment of the physical peripheral devices with the logical addresses so provided. After the total amount of entries are inserted into the reassignment table, certain subentries thereof are checked for error conditions and if no error exists, the number of entries is kept track of until all of the reassignments are effected. Thus, after entries are provided for the reassignment into the reassignment table, and with the device table including the logical address associated with the particular device specific table and accordingly the particular physical peripheral device, the device specific information in the device specific tables are capable of transfer to a controller in order to control the operation of the specific peripheral device.

BRIEF DESCRIPTION OF THE DRAWINGS

The above and other objects of the invention are achieved in accordance with the detailed description hereinafter in accordance with the illustrated embodiments wherein.

DETAILED DESCRIPTION OF THE PREFERRED EMBODIMENT

Figure 1A:
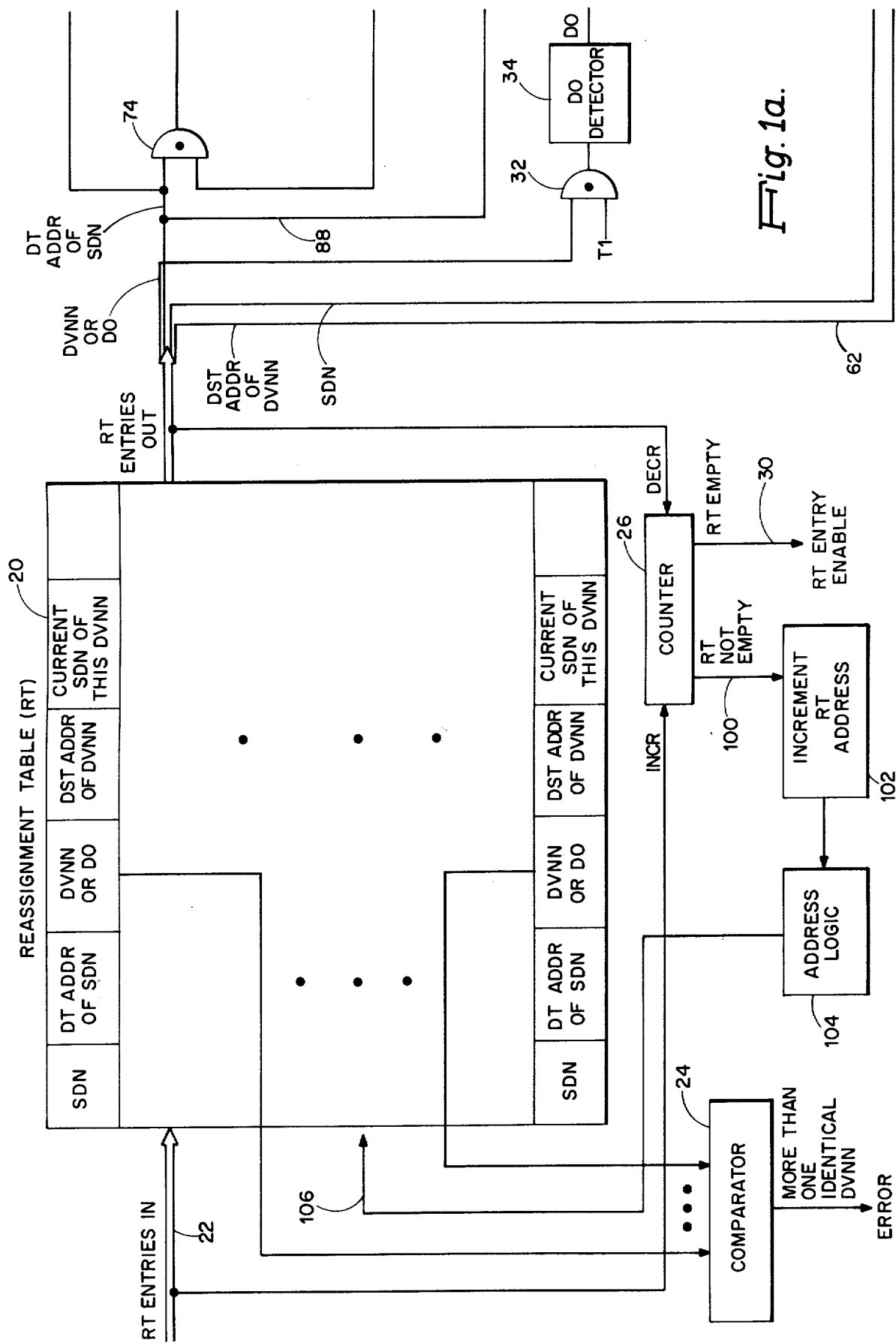
FIG. 1, as represented in the three drawings sheets as FIGS. 1a, 1b, and 1c is a detailed block diagram of the system of the present invention.
Figure 1B:
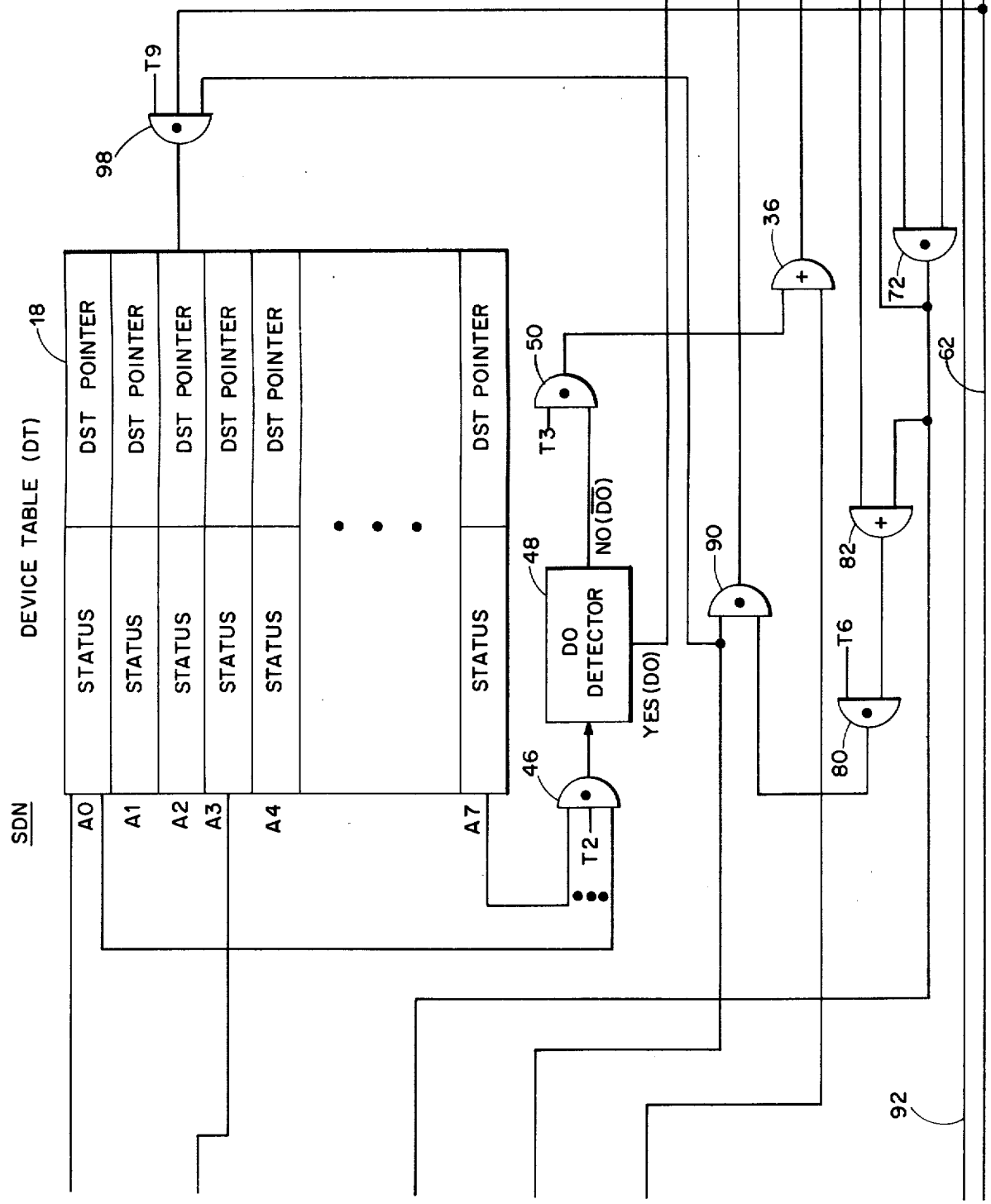
Figure 1C:
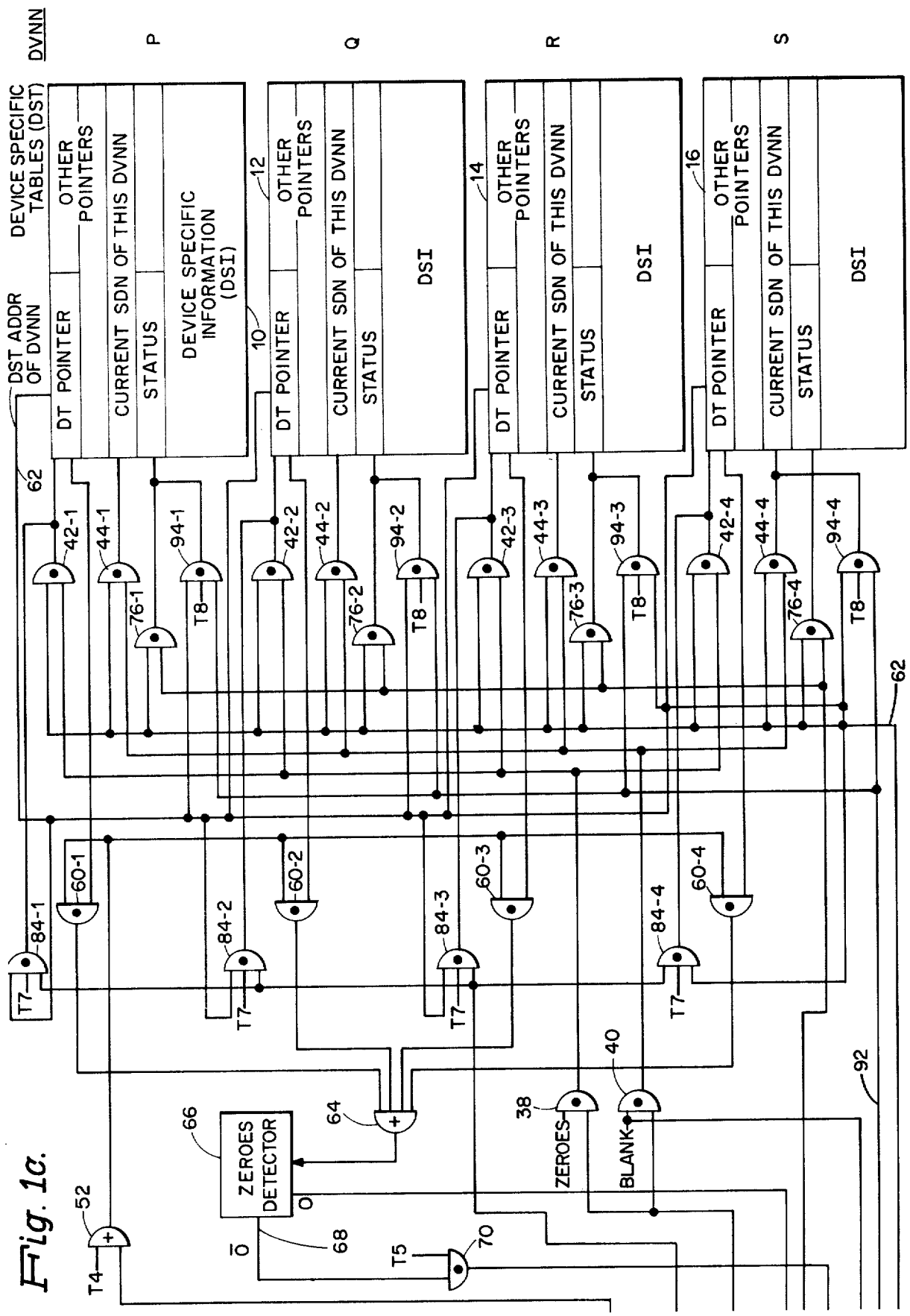

With reference to FIG. 1, the system of the present invention is illustrated. Basic to the system of the present invention are the device specific tables (DST) 10, 12, 14 and 16, each of which is designated to a particular peripheral device. Only four such device specific tables are shown for ease of illustration. Coupled to the device specific tables is a device table (DT) 18 only one of which is shown. There may be more than one device table 18 for example wherein each device table is designated for a particular group of peripheral devices. Another table which is part of the input/output tables as are tables 18 and 10 through 16, is the reassignment table (RT) 20 which includes locations for receiving for example up to eight entries which entries are commands for reassignment of physical and logical addresses as shall be hereinafter explained.

Each of these tables, except the reassignment table is specifically described in the above related application. The device specific table is described therein as the termination table and the device extension table and are shown as one table here, i.e., the device specific table, for ease of illustration. Generally however, the device specific tables 10 through 16 are each, as mentioned before, related to a particular peripheral device and include status information regarding the particular peripheral device and other device specific information such as the physical and electrical parameters of the device. Generally speaking, the device extension tables each include approximately 30 to 40 words. In addition, the device specific tables each include the current logical address (SDN) with which the particular physical peripheral device or the physical address (DVN) is associated or coupled. Each device specific table also includes in addition to other pointers, a pointer back to an associated location in the device table 18. The device table in addition includes a plurality of locations each of which is related to the logical address (SDN) of the particular peripheral device as utilized in a particular program. Each such location includes a pointer to the particular device specific table as well as status information substantially as reflected in the status informataion in the device specific table.

In FIG. 1, the logical addresses (SDN) of the location in the device table 18 are designated A0 through A7 for example. Also, the device specific tables are designated with physical addresses (DVNN) P, Q, R, and S. The actual addresses of the tables as may be found in a data processor's memory are different from the logical and physical addresses.

The pointers in the device specific tables and the device table are reassigned in order to effect the reassignment of a particular logical address to a particular physical address of a given peripheral device. In order to effect such reassignment, reassignment table 20 is included to receive commands for causing such reassignment to take place. The reassignment table includes a plurality of locations, for example, eight locations. The entries or commands in each of these locations after having been received are operated on one by one until a complete reassignment based upon the entries in table 20 takes place. Thus, the operator may make reassignment in groups by causing for example up to eight such commands to be entered into the reassignment table 20. Each entry or command into the reassignment table includes a plurality of subentries. As shown in FIG. 1, the first subentry is the logical address (SDN) of the peripheral device as reflected in the program so utilizing the peripheral device. A second subentry in the reassignment table 20 is the address of the location in the device table of such logical address (SDN). The third subentry in the reassignment table is the physical address (DVNN) of the peripheral with which the logical address is to be associated and accordingly reassigned or the indication as to whether or not this is a dial out request thereby indicating that the peripheral device associated with the logical address (SDN) is to be no longer so coupled or assigned. The fourth subentry in each location of reassignment table 20 is the device specific table address of the physical address (DVNN) of the particular peripheral device. In addition to other entries not shown, the last entry shown in each location of reassignment table 20 is the current logical address (SDN) of this particular peripheral physical address (DVNN) indicated in the third subentry.

Figure 2:
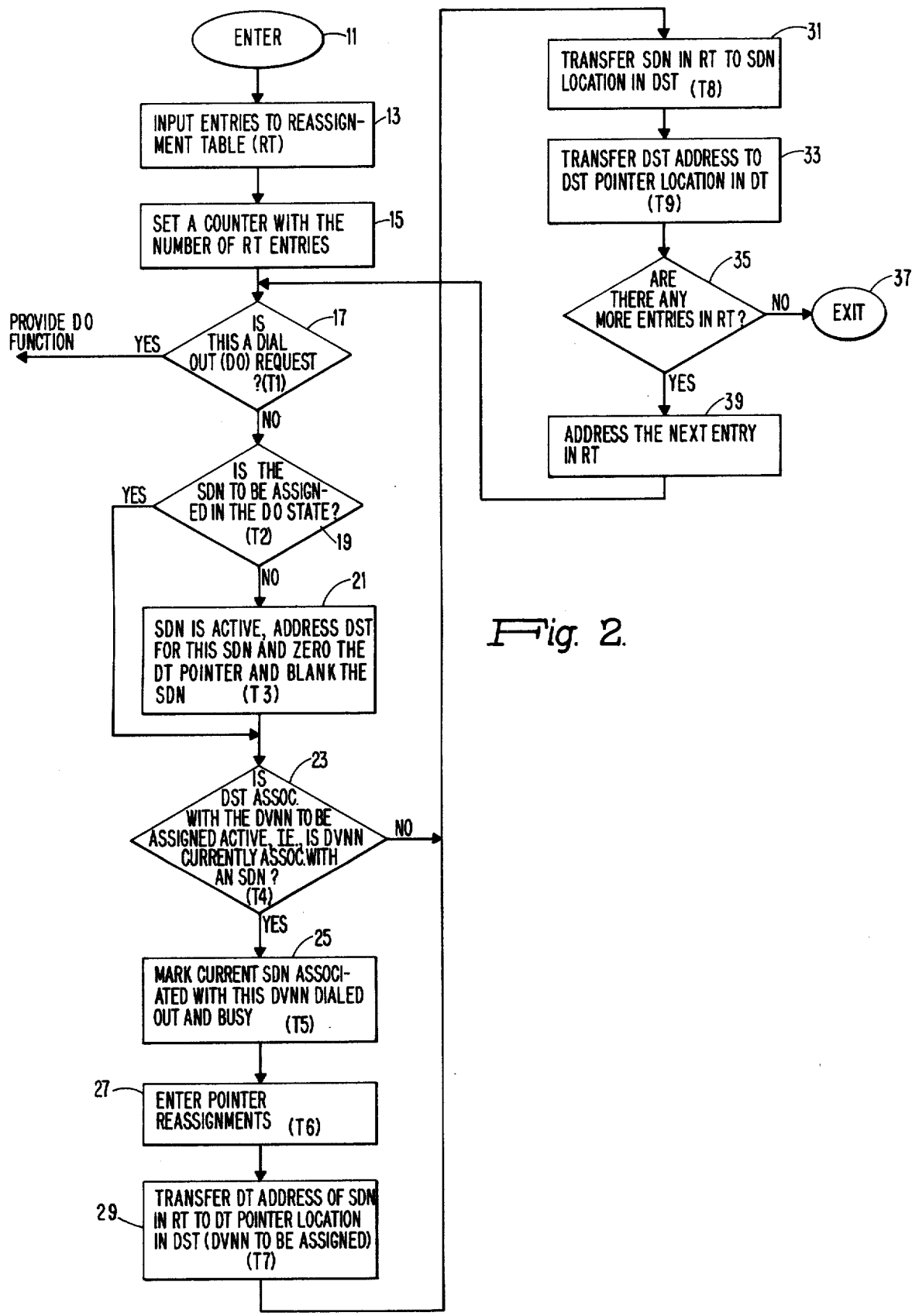
FIG. 2 is a flow diagram illustrating the operation of the system of the present invention.

The present invention shall be described in terms of a specific example by way of explanation of the operation thereof in accordance with the flow diagram of FIG. 2 in conjunction with the logical diagram as shown in FIG. 1. Before discussion of the specific example, however, the generic operation of the apparatus shown in FIG. 1 shall be explained. After each of the entries or commands are received in the locations, as addressed by logic 104, of reassignment table 20 by means of bus 22, certain error conditions are checked such as for example whether or not there is more than one identical peripheral physical address (DVNN) subentry included. This is done by means of comparator 24 which produces an error signal if there is more than one identical DVNN. The reason for this is that more than one logical address (SDN) cannot be assigned to the same peripheral physical address (DVNN). In addition, the number of entries in the reassignment table 20 are kept track of by means of a counter 26 which is incremented upon receipt of an entry on bus 22 and which is decremented upon transfer of an entry via bus 28. When the counter 26 is empty, further entries are enabled into the reassignment table 20 by means of the signal one line 30. Further, each time an entry is operated on, the next entry will be addressed by incrementing address logic 104 by means of the increment address logic 102 which may simply be an adder, in response to the signal on line 100 indicating that table 20 is not empty. These operations are associated with the blocks 11, 13 and 15 in FIG. 2.

In accordance with the flow of the operation of the present invention and with reference to the flow diagram of FIG. 2, the operation of the apparatus of FIG. 1 shall be explained in terms of the appropriate operation in terms of time as identified by timing pulses T1, etc., which may be generated by the data processor's internal clock or under program control, the specific timing between such timing signals T1, etc., not being essential to the present invention. Upon fetching the subentries in a particular reassignment table location, at time T1, and should there be a dial out condition (block 17), then AND gate 32 is enabled to pass such dial out indication to dial out detector 34 which indicates a dial out signal so as to via the various AND gates and OR gates including OR gate 36 and AND gates 38 and 40 as well as AND gates 42 and 44, couple to place zeros in the DT pointer location of the respective device specific table and to blank out, by use of a unique signalor word, the logical address (SDN) for which this specific peripheral device was assigned. The distinction between the zeros and blanking is that in the print out process, if required, of such information the zeros will be printed as zeros and the blanking will appear as no information at all. Thus, the dial out function is provided as indicated in response to the YES condition of block 17 of FIG. 2. If this is not a dial out request, then block 19 is entered and the first question that is asked is whether the SDN to be assigned is in the dial out (DO) state. This is executed at time T2 when the location in device table 18 addressed provides a portion of its status information indicating whether or not the respective device identified by the logical address is or is not in the dial out state. Such information is provided to AND gate 46 which is fully enabled in response to the T2 timing pulse to provide the dial out detector 48 with such information and accordingly generates a YES or NO signal, i.e., there is a dial out or there is not a dial out condition so indicated in the status information in the entry of the device table addressed. The outputs of detector 48 are coupled with AND gate 50 and OR gate 52.

First, if there is not a dial out condition, then at time T3 AND gate 50 will be enabled so as to cause via OR gate 36 the respective zeros and blanking operation to take place with respect to the DT pointer and the SDN indication in the addressed device specific table. This is similar to the operation as indicated in response to the dial out detector 34. The device specific table address is provided via bus 28 from the reassignment table 20 and accordingly enables the respective one of the gates 42 and 44 to allow the proper device specific table to be so addressed and operated upon.

Thus with the answer to block 19 NO, i.e., that the logical address (SDN) to be assigned is not in a dialed out state, then such logical address accordingly is accessed. Accordingly block 21 of FIG. 2 is entered. As previously discussed the blanking and zeroing operation takes place at time T3. At time T4, the operation of block 23 is provided. Block 23 may be entered from either the YES answer of block 19 or from block 21. Accordingly, either the condition of the YES output from detector 48 or the T4 signal, both being received at OR gate 52, will activate the enabling operation of block 23 via AND gates 60. The operation of block 23 asks the question as to whether or not the physical address, i.e., the peripheral device, to be assigned, is active. In other words the question is whether or not the physical address in the device specific table is associated with a logical address (SDN). This is checked by detecting whether or not the addressed device specific table, addressed via line 62, includes all zeroes therein. This condition may have also been checked by determining whether or not the SDN location in the addressed device specific table included all blanks. In the former case, such condition in the DT pointer location of the device specific table addressed is utilized in order to provide a signal from one of the AND gates 60, in response to either a YES signal from detector 48 or timing signal T4, to OR gate 64, the output of which is coupled to the zeroes detector 66. If the physical address (DVNN) is currently associated with a logical address (SDN), then the output from zeroes detector 66 will be a $\overline{ZERO}$ on line 68 and will correspond to the YES output on block 23 in FIG. 2.

Thus, having determined that the DVNN address is currently associated with an SDN and accordingly the peripheral device associated with such DVNN, i.e., the physical address is active, the logical address (SDN) is dialed out as busy at time T5 by blanking out the status information contained for such SDN in both the device table 18 and the respective one of the device specific tables (block 29). This is accomplished by the enabling of AND gate 70 which couples to enable AND gate 72 to provide blanking signals via AND gate 74 to the addressed entry in device 18 thereby blanking out the status field. Further, the status information in the device specific table is blanked out by means of the enabling of one of AND gates 76. Having now operated upon the device specific table and the device table, the pointers in both of such tables, i.e., the DT pointer and the DST pointer are now changed to perform the reassignment function of the apparatus of the present invention.

The pointer reassignment function is then entered at time T6 by the enabling of AND gate 80 whose input is received via OR gate 82. OR gate 82 functions to provide the full enabling signal to AND gate 80 if either the conditions of block 25 in FIG. 2 or the NO result from block 23 of FIG. 2 are generated. Thus, after block 27 is exited, block 29 is entered and the DT address of the SDN in the reassignment table is transferred to the DT pointer location in the addressed device specific table. This occurs at time T7 by means of AND gate 84. One of AND gates 84 is fully enabled in response to timing pulse T7 and the respective address of the device specific table; and accordingly the DT address of the SDN as received on line 88 from the reassignment table 20 is enabled through such gate 84 to the DT pointer location in response to the full enabling of AND gate 90 whose other input is received from AND gate 80. After this operation is complete, at time T8, the SDN in the reassignment table is transferred to the SDN location in the device specific table. This is accomplished by the enabling of the SDN on line 92 into such SDN location in the device specific table addressed by means of the enabling of one of AND gates 94. AND gates 94 receive enabling inputs including the T8 timing pulse and the address on line 62 in order to pass the SDN to the proper DST. After this operation, block 33 of FIG. 2 is entered and the operation of transferring the DST address to the DST pointer location in the device table is provided at time T9.

This operation at time T9 is effected by the full enabling of AND gate 98 in response to the timing signal T9 and the device table address in order to pass the DST address of the reassigned physical address (DVNN) into the DST pointer location addressed in device table 18. After this operation, the counter 26 is checked to determine whether there are any more entries in the reassignment table. If the counter indicates zero, then this means that the reassignment table is empty and accordingly further entries may be enabled into reassignment table 20 in response to the RT entry enable signal on line 30. As indicated, the RT empty condition indicates that the basic flow as indicated in FIG. 2 is exited as indicated in block 37. If there are more entries in the reassignment table as indicated by block 35, then the next entry in the reassignment table is addressed. This is accomplished by means of the incrementing of the RT address as indicated by block 39 in FIG. 2. The RT not empty signal generated by counter 26 thereby operates to send the signal on line 100 to increment address logic 102 so as to provide the proper address via well known address logic 104 thereby addressing the reassignment table on line 106. At this point, block 39 of FIG. 2 is exited and block 17 is entered in FIG. 2 and the process is repeated until all entries in the reassignment table 20 have been operated upon.

Thus, by way of example, and assuming that the following initial conditions are present, then the following assignments or couplings are in existence before the reassignment takes place. Such exemplary initial conditions are the logical address A0 assigned to physical address P, logical address A1 assigned to physical address Q, logical address A3 assigned to physical address S, logical addresses A2 as well as A4 through A7, as shown by way of example, not used, and physical address R and accordingly the physical peripheral device associated therewith not assigned and presently not in use. From that initial condition, and assuming that there are two entries in reassignment reassigment table, the first being to reassign logical address A0 to the physical address R, which as noted hereinabove had not been used, and that the second entry being to reassign the logical address A1, which has previously been assigned to physical address Q, to physical address S, physical address S, it being noted having previously been assigned to logical address A3, accordingly the following operation takes place.

Accordingly, by the above example, initially, the DST pointers in device table 18 for logical addresses (SDN) A0, A1, A2 and A3 are respectively the adress of DVNN P, DVNN Q, not used, and DVNN S. The DT pointer and SDN entries in the DST tables for physical addresses (DVNN) P, Q, R and S will be respectively the A0 address in DT and A0 (SDN), the A1 address in DT and A1 (SDN), zeroes and blanks, and the A3 address in DT and A3 (SDN). In response to the two commands indicating reassignment, wherein A0 is to be assigned to R and A1 is to be assigned to S, and after the necessary zeroing and blanking operations, the tables will look respectively as follows and reassignment will have been accomplished. In the DT table, the DST pointers for logical addresses A0 and A1 will be DVNN R and DVNN S respectively, whereas SDN A2 and A3 will not point to any physical address. With respect to the DST tables, the DVNN P and Q associated DST tables will be blanks or zeroes as in accordance with the above description and the DVNN R and S associated DST tables will respectively have in their DT pointer and SDN locations the A0 address in DT and A0 (SDN) and the A1 address in DT and A1 (SDN).

Having described the invention, what is claimed as new and novel and for which it is desired to secure Letters Patent is:

1. A data processing system including a data processor having a multiprocessing capability, said data processor coupled for communication with a plurality of peripheral devices, each of said peripheral devices having associated therewith a physical address, and each of the processes in said data processor capable of coupling to said physical addresses and accordingly said peripheral devices by means of logical addresses, said system including reassignment means for assigning the coupling between said logical addresses and said physical addresses, said reassignment means comprising:
   A. a plurality of first tables, each of said first tables associated with one peripheral device and each of said first tables including peripheral device specific information intended to assist in the control of the respective peripheral devices, each of said first tables having a unique physical address;
   B. at least one second table, said second table including a plurality of first locations, each of said first locations corresponding to a unique logical address, each said first location including a first sublocation capable of including a first pointer to one of said first tables, each of said first locations further comprising a second sublocation capable of including status information respecting the associated one of said peripheral devices;
   C. wherein each of said first tables comprises
      1. a second location for a second pointer to the address of the one of said first locations in said second table which is associated with the respective first table,
      2. a third location for the logical address with which said first table and accordingly said physical address is coupled, and
      3. specific information related to the peripheral device with which the first table is associated, said specific information intended to assist in the control of the operation of the associated peripheral device;
   D. means for receiving a reassignment command; and
   E. means, responsive to said reassignment command, for coupling said second table and at least one of said first tables, said means for coupling including
      1. means for loading one of said first locations in said second table with a said first pointer to the one of said first tables whose associated physical address is being reassigned, and
      2. means for loading the second location of the said one of said first tables, whose associated physical address is being reassigned, with a said second pointer to the one of said first locations of said second table whose associated logical address is being reassigned.

2. A system as in claim 1 wherein said reassignment means further comprises:
   A. a third table having a plurality of fourth locations, each of said fourth locations including a plurality of sublocations;
   B. means for entering at least one said reassignment command into one of said fourth locations, said command including and accordingly said sublocation including information relative to the
      1. logical address to be reassigned,
      2. the second table address of said logical address to be reassigned,
      3. the physical address to be reassigned, and
      4. the first table address associated with said physical address to be reassigned; and
   C. means, responsive to said reassignment command and coupled with said second table and at least one of said first tables, for coupling said logical address to said physical address, said means for coupling included in said means for coupling said second table and at least one of said first tables.

3. A system as in claim 2 wherein said means for coupling comprises:
   A. means for placing said second table address of said logical address to be reassigned, in said second location for said second pointer, in the respective one of said first tables;
   B. means for placing said logical address to be reassigned in said third location, for the logical address, in the respective one of said first tables; and
   C. means for placing said first table address associated with said physical address to be reassigned, in said first sublocation for said first pointer, in said second table.

4. A system as in claim 3 further comprising:
   A. counter means;
   B. means for coupling said counter means with said third table for indicating the number of reassignment commands in said third table;
   C. means for addressing successive reassignment commands in said third table; and
   D. means, responsive to said counter means for indicating that said third table does not contain any further reassignment commands, whereby in response thereto one or more further reassignment commands may be entered by said means for entering.

5. A system as in claim 4 further comprising:
   A. means for comparing each of said reassignment commands in said third table when there is more than one said reassignment command; and
   B. means for generating an error signal if either of said commands is not consistent with another of said commands.

6. A system as in claim 5 wherein said comparison is made between said physical addresses to be reassigned in each of said commands.

7. A system as in claim 3 wherein said reassignment means further comprises means, coupled with said second table and at least one of said first tables, for uncoupling said logical address from said physical address.

8. A system as in claim 7 wherein said means for uncoupling comprises:
   A. means for deleting said second pointer in said second location; and
   B. means for deleting said first pointer in said first sublocation.

9. A system as in claim 1 wherein said reassignment means further comprises:
   A. means for receiving at least one said reassignment command; and
   B. means, responsive to said reassignment command and coupled with said second table and at least one of said first tables, for coupling said logical address to said physical address.

10. A system as in claim 9 wherein said means for coupling comprises:
    A. means for transferring a first pointer to said first sublocation;
    B. means for transferring said second pointer to said second location; and
    C. means for transferring said logical address with which said first table is to be coupled to said third location.

11. A system as in claim 9 further comprising:
    A. means for indicating the number of reassignment commands, in a group of reassignment commands, in response to which said reassignment means will respond;
    B. means for successively addressing said reassignment commands in said group; and
    C. means for requesting another group of assignment commands when said number of said commands is zero.

12. A system as in claim 1 wherein said system includes the capability of emulating another system, wherein said logical addresses correspond to addresses provided in the emulating system, and wherein said physical addresses correspond to addresses in the emulated system to be coupled with said emulating system's provided logical addresses.

* * * * *